Figure 1:
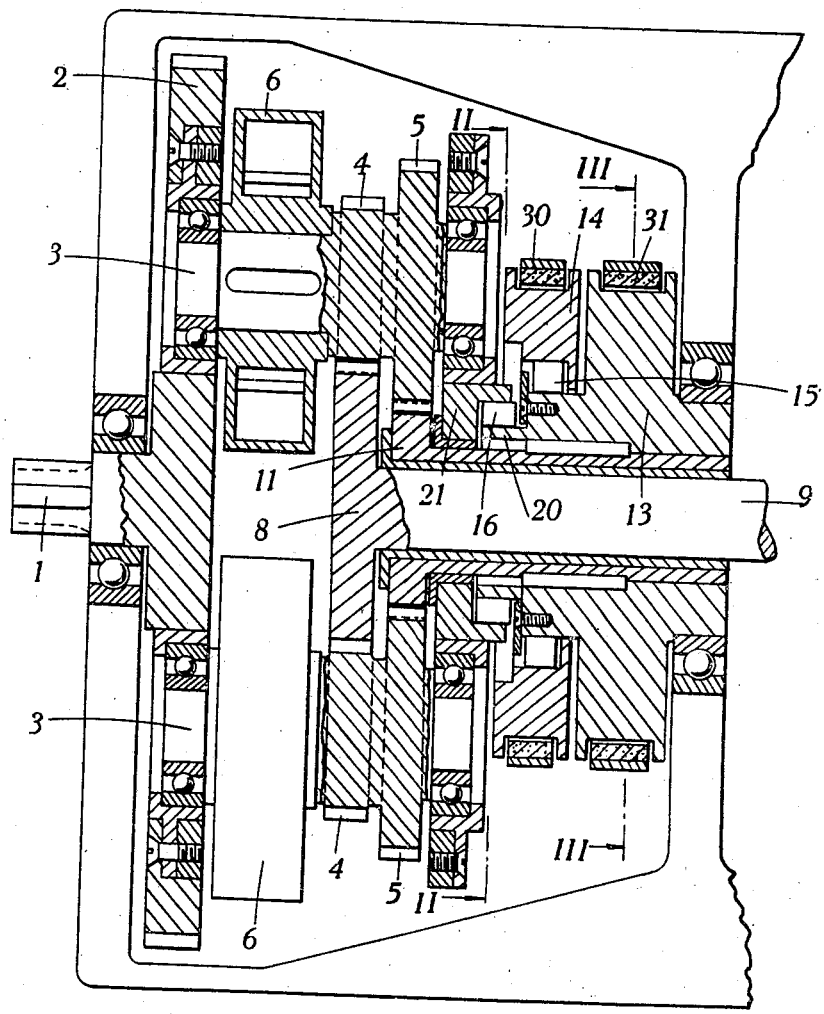

Dec. 5, 1939. P. MATTIA 2,182,542
CHANGE SPEED MECHANISM
Filed March 22, 1937 2 Sheets-Sheet 1

INVENTOR
P. MATTIA.
BY [signature]
ATTORNEYS

Dec. 5, 1939.  P. MATTIA  2,182,542
CHANGE SPEED MECHANISM
Filed March 22, 1937  2 Sheets-Sheet 2

INVENTOR
P. MATTIA,
BY
ATTORNEY

Patented Dec. 5, 1939

2,182,542

UNITED STATES PATENT OFFICE 2,182,542

CHANGE SPEED MECHANISM

Pietro Mattia, Embabeh, Cairo, Egypt

Application March 22, 1937, Serial No. 132,376
In Great Britain March 25, 1936

1 Claim. (Cl. 74—260)

This invention relates to epicyclic transmission gears or change speed mechanisms of the type of that set forth in my application Serial No. 714,484 filed March 7, 1934, and my application Serial No. 67,340 filed March 5, 1936. In the gear shown therein, the power of the driving shaft is transmitted to a pinion on a driven shaft through a planet pinion meshing with a toothed reaction wheel which is capable of rotation independently of the said shafts but is prevented from rotating in one direction (referred to in what follows as a backward direction) by a one-way brake or clutch. The planet pinion is moreover provided with means mounted for rotation with it which, under the influence of the centrifugal force engendered by rotation about the axis of the planet pinion and of the centrifugal force engendered by rotation about the axis of the driving and driven shafts, act so as to allow or to prevent planetation of the planet according as one or the other of the said centrifugal forces is for the time being preponderant. In order to enable the engine to be used as a brake, the toothed reaction wheel is so mounted and arranged that when the driven shaft tends to run faster than the speed at which it is driven by the driving shaft, there is an effective transmission of power from the driving shaft to the driven shaft.

The present invention is concerned with improvements in or modifications of the invention set forth in the aforementioned applications.

According to one feature of the invention, the planet carrier of the gear is so designed as to serve as a flywheel for the engine. For this purpose, it is only necessary to ensure that its mass is sufficient to suit the needs of the engine that is used to drive the gear and to provide gear teeth on its rim for engagement with the engine starter. This feature considerably reduces the overall size of the engine-gearbox assembly and also leads to a general simplification.

According to another feature of the invention, an indispensable part of the gear is used to form a clutch. As has already been explained the reaction wheel is prevented from rotating in the backward direction and it is indeed because it is prevented from rotating in this direction that it provides the necessary reaction abutment. If it is allowed to rotate in the backward direction no reaction abutment will be present and no power will be transmitted. This feature of the invention can therefore be put into effect by providing means for allowing the reaction wheel to rotate when desired in the backward direction. In the preferred arrangement, the reaction wheel is prevented from rotating in a backward direction by means of a one-way brake of the roller type, having a fixed outer member and a movable inner member. If the outer member is instead mounted to rotate and is provided with a brake-band which can, when desired, be brought into operation so as to stop its rotation a very simple and effective form of clutch is provided and it will be appreciated that an indispensable part of the gear is then being used in place of the separate clutch which would otherwise have to be used.

A third feature of the invention relates to the provision of means for enabling the braking power of the engine to be increased. The elements of the gear are of course arranged so as to provide a step-down transmission between the driving and driven shafts. In accordance with this feature of the invention, the elements are also so arranged that an equivalent step-up transmission can be provided between the driven shaft and the driving shaft when the driven shaft tends to over-run the driving shaft.

Figure 2:
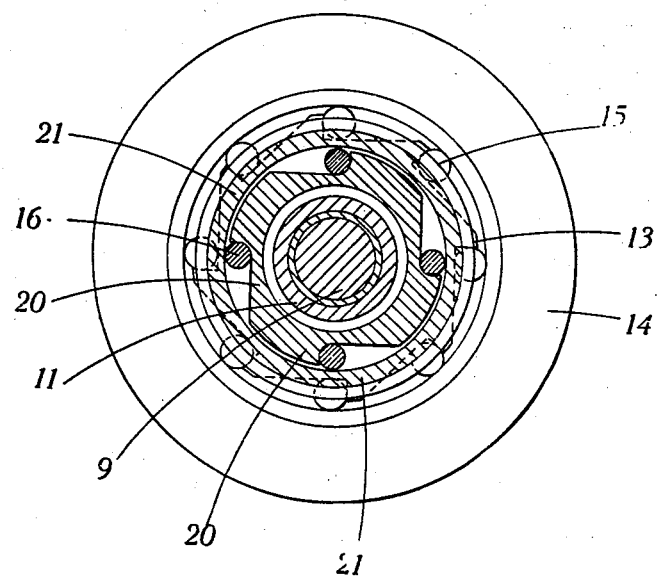
Figure 3:
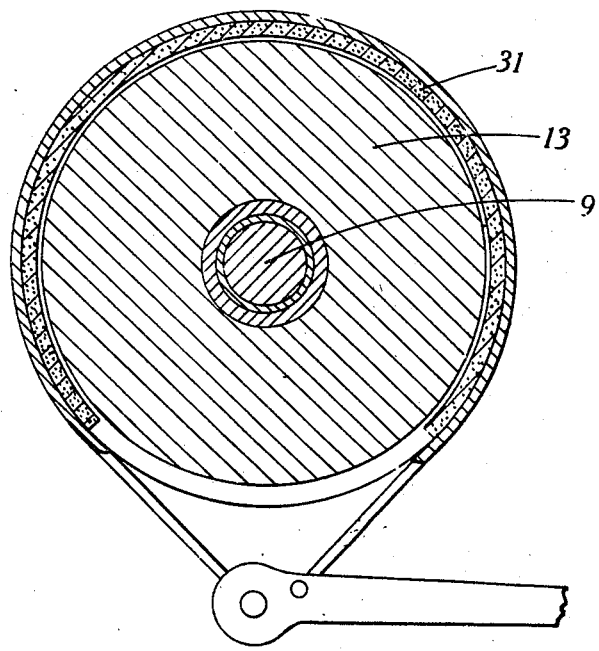

In order that the invention may be thoroughly understood and be more readily carried into effect an example of construction of a gearbox embodying the features of the invention will now be described with reference to the accompanying drawings, in which Figure 1 is a longitudinal section through a two-speed gearbox, and Figure 2 is a section on the line II—II in Figure 1 and Figure 3 is a section on the lines III—III in Figure 1.

The gear shown in the drawings has a driving shaft 1 to which is rigidly attached a planet carrier 2. A number of spindles 3 are arranged to rotate in this carrier and support a pair of pinions 4, 5 rigidly connected to each other. A vaned container 6 containing a small amount of mercury is also mounted on each of the spindles 3. The smaller of the planet pinions 4 meshes with a pinion 8 on the driven shaft 9. The larger planet 5 meshes with a pinion 11 which can be prevented from rotating by tightening the brake band on the part 13 and which thus serves as a reaction wheel. This pinion 11 is prevented from rotating in the direction in which the driving shaft tends to drive it (the backward direction) by a freewheel device consisting of rollers 15 mounted between the part 13 fixed to the pinion and the part 14 which, during normal operation of the gear is held stationary by the brake band 30. The pinion 11 thus acts as a reaction wheel. The pinion 11 is also prevented from over-running the planet carrier 2 or the driving shaft 1 because of the provision of a free wheel device consisting of rollers 16 mounted between a part 20 fixed to the member 13 and a part 21 fixed to the planet carrier.

The gear operates as follows: The planet carrier 2 is driven by the driving shaft 1 and carries with it the pinions 4, 5. The wheel 11 being prevented from rotating in the backward direction, there is an effective transmission of power through the pinions 4, 5 to the pinion 8 on the driven shaft 9. As the pinion 4 is smaller than the pinion 5, the pinions 11, 5, 4 and 8 form a reduction gearing. The gear can operate under two different working conditions. The containers 6 on the spindles 3 can rotate about the axis of the spindles and also about the axis of the shafts. The mercury in them is thus subjected to two centrifugal forces. If the centrifugal force due to rotation about the axis of the driving shaft exceeds the centrifugal force due to rotation about the axis of the spindles 3, then the mercury in the containers will be flung out as far as possible from the axis of the driving shaft and the planets will no longer rotate. In other words, the shaft 1, the containers 6, the pinions 4 and 5, the pinion 11 and the driven shaft 9 will rotate together as a unit; that is to say, there will be a direct drive from the driving to the driven shaft. When however, the centrifugal force due to rotation about the axis of the spindles 3 is preponderant the planets 4 and 5 will planetate about the pinions 11 and a reduced gear ratio will be obtained.

If the brake-band 30 is loosened the part 14 and therefore the part 13 and therefore the wheel 11 will be free to rotate in the backward direction and there will therefore be no reaction abutment for the pinions 5 and no effective transmission of power from the driving to the driven shaft. The gear will not operate until the brake-band 30 is tightened on the member 14. In other words the brake-band and the part 14 act as an effective clutch.

If a car on which such a gear is mounted, is going down a steep hill the road speed may be greater than the engine speed and the shaft 9 will tend to drive the shaft 1. This drive will be resisted by the engine because of the provision of the free-wheel device 20, 21. If now the brake-band 31 which is normally loose on the part 13 is tightened, the part 13 of the free-wheel device 13, 14 and therefore the pinion 11 will be immobilised and the drive from the shaft 9 to the shaft 1 must take place through the pinions 8 and 4 while the pinions 5 which are larger than the pinions 4 roll on the stationary wheel 11. A step-up gearing is therefore provided between the shafts 9 and 1 so that a very powerful braking effect is obtained.

The planet carrier 2 is provided near its periphery with a ring of teeth which are adapted to be connected to the engine starter, not shown. The shaft 1 is the engine shaft itself or is rigidly connected thereto. The planet carrier therefore acts as the engine flywheel.

It will be seen that the features of the present invention lead to a very essential simplification of the gear. The gear can be used not only to replace the more usual kind of gearbox but also enables the usual flywheel and clutch to be dispensed with and it is to be noted that the provision made for using the gear itself as the flywheel and as the clutch does not increase the overall length of the gear.

It is, of course, clear that the invention could be applied to a gearbox giving a greater number of speeds than that illustrated. These extra speeds can be obtained by arranging a further unit such as is shown in Figure 1 so as to be driven by the shaft 9. In that case the provisions made for enabling the step-up gearing to be obtained between the driven shaft and the driving shaft when the latter tends to drive the former and the provision made for enabling a part of the gear to be used with a clutch can be made in any one of these units. It is, of course, preferable that the clutch means should be provided in the unit which is nearest to the engine so that when the engine is idling it is turning, or tending to turn, a minimum number of parts of the gear.

I claim:

An epicyclic transmission gear comprising a driving shaft, a planet carrier on said driving shaft, a pair of planet pinions of different diameters constrained to rotate together mounted on said planet carrier, a pinion on said driven shaft meshing with the smaller of said planet pinions, a toothed reaction wheel meshing with the larger of said planet pinions, a free-wheel device preventing rotation of said reaction wheel in the direction opposite to that in which said planet carrier rotates, a free-wheel device allowing rotation of said reaction wheel in the direction in which said planet carrier rotates only at a speed which is not in excess of that of said planet carrier, means for putting said first mentioned free-wheel device out of action and means for preventing, when desired, rotation of said reaction wheel in either direction.

PIETRO MATTIA.